(12) United States Patent
Straussnigg (10) Patent No.: US 7,359,443 B2
(45) Date of Patent: Apr. 15, 2008

(54) METHOD FOR COMPENSATING FOR PEAK VALUES DURING A DATA TRANSMISSION WITH DISCRETE MULTITONE SYMBOLS AND A CIRCUIT ARRANGEMENT FOR CARRYING OUT THE METHOD

(75) Inventor: Dietmar Straussnigg, Villach (AT)

(73) Assignee: Infineon Technologies AG, Munich (DE)

(*) Notice: Subject to any disclaimer, the term of this patent is extended or adjusted under 35 U.S.C. 154(b) by 1065 days.

(21) Appl. No.: 10/341,830

(22) Filed: Jan. 14, 2003

(65) Prior Publication Data

US 2003/0165159 A1 Sep. 4, 2003

(30) Foreign Application Priority Data

Jan. 15, 2002 (DE) .................. 102 01 283

(51) Int. Cl.
*H04K 1/10* (2006.01)
(52) U.S. Cl. ..................... 375/260; 375/350
(58) Field of Classification Search ............... 375/260, 375/350
See application file for complete search history.

(56) References Cited

U.S. PATENT DOCUMENTS

| | | | | |
|---|---|---|---|---|
| 5,500,874 A | * | 3/1996 | Terrell | 375/232 |
| 6,002,950 A | * | 12/1999 | Muraoka | 455/570 |
| 6,314,146 B1 | * | 11/2001 | Tellado et al. | 375/346 |
| 6,597,746 B1 | * | 7/2003 | Amrany et al. | 375/296 |
| 6,968,000 B2 | * | 11/2005 | Schelstraete | 375/229 |
| 7,139,323 B2 | * | 11/2006 | Erving et al. | 375/260 |
| 2001/0017893 A1 | * | 8/2001 | Do et al. | 375/247 |
| 2002/0163959 A1 | * | 11/2002 | Haddad | 375/229 |
| 2002/0168013 A1 | * | 11/2002 | Attallah et al. | 375/259 |
| 2003/0067990 A1 | * | 4/2003 | Bryant | 375/259 |

FOREIGN PATENT DOCUMENTS

DE 198 50 642 A1 5/2000

\* cited by examiner

*Primary Examiner*—Kwang Bin Yao
*Assistant Examiner*—Sameer Aghera
(74) *Attorney, Agent, or Firm*—Jenkins, Wilson, Taylor & Hunt, P.A.

(57) ABSTRACT

The invention provides a method for transmitting an analog data stream (101) from a data stream transmitter (214) to a data stream receiver (215) by means of discrete multitone symbols (208), in which data (123) to be transmitted are input into a data input device (201) of the data stream transmitter (214), the data to be transmitted are coded in a coding device (202) and are combined into coded data blocks (125), the coded data blocks (125) are transformed into a multitone signal (303) in an inverse transformation device (203), the at least one multitone symbol (208) is converted into an analog transmitter signal (211) in a digital-to-analog converter (204), and the analog transmitter signal (211) is transmitted via a transmission channel (102).

10 Claims, 5 Drawing Sheets

METHOD FOR COMPENSATING FOR PEAK VALUES DURING A DATA TRANSMISSION WITH DISCRETE MULTITONE SYMBOLS AND A CIRCUIT ARRANGEMENT FOR CARRYING OUT THE METHOD

TECHNICAL FIELD

The present invention relates to a method for transmitting an analog data stream from a data stream transmitter to a data stream receiver with discrete multitone symbols, and relates in particular to a method for compensating for peak values during a data transmission with discrete multitone symbols and a circuit arrangement for carrying out the method.

BACKGROUND ART

Usually, a multitone method (DMT, discrete multitone, discrete multitone modulation) is used for an asymmetric data stream transmission via customary telephone lines, customary telephone lines being designed in a conventional [lacuna] as asymmetrical digital subscriber lines (ADSL).

One essential advantage of ADSL transmission techniques is that it is possible to use conventional cable networks for a transmission, pairs of copper cores that are twisted together usually being used.

Digital high-speed subscriber lines according to the prior art are described see for example in the publication "High-speed digital subscriber lines, IEEE Journal Sel. Ar. In Comm., Vol. 9, No. 6, August 1991".

The known transmission methods with a high data rate based on digital subscriber lines (DSL) include a number of VDSL (Very High Data Rate DSL) arrangements, wherein e.g. methods such as CAP (Carrierless Amplitude/Phase), DWMT (Discrete Wavelet Multitone), SLC (Single Line Code) and DMT (Discrete Multitone) can be used therefor. In the case of the DMT method, the transmission signal is provided from multiple sinusoidal or cosinusoidal signals, each individual sinusoidal or cosinusoidal signal being able to be modulated both in terms of amplitude and in terms of phase. The multiple modulated signals thus obtained are provided as quadrature-amplitude-modulated signals (QAM=Quadrature Amplitude Modulation).

Figure 4:
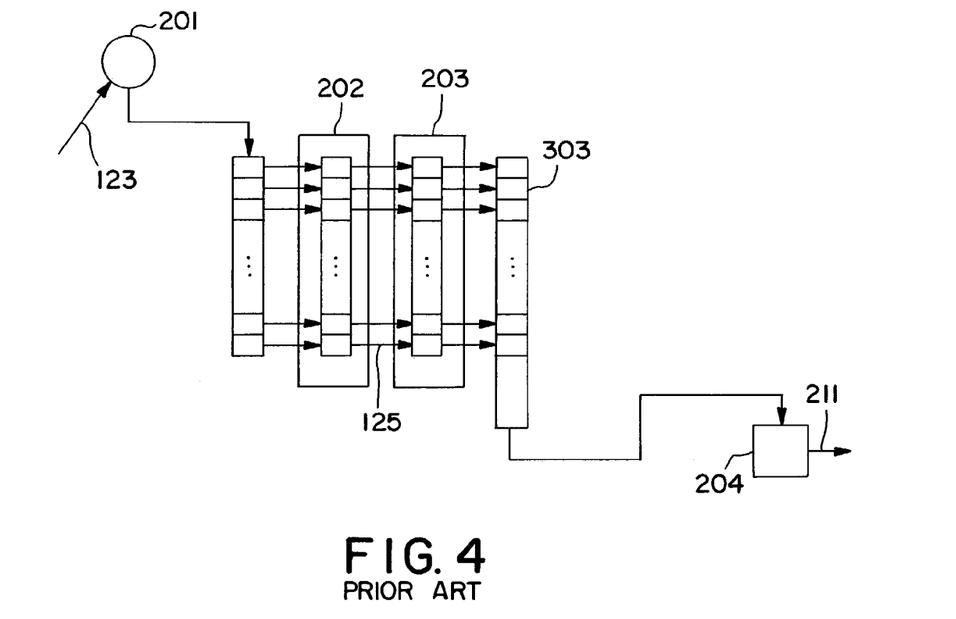
FIG. 4 shows a block diagram of a data stream transmitter without any filtering devices according to the prior art.

FIG. 4 shows a conventional data stream transmitter, into which data 123 to be transmitted are input via a data input device 201. The data 123 to be transmitted are fed to a coding device 202, in which the data are first coded and then combined to form coded data blocks 125, a predeterminable number of bits to be transmitted being assigned to a complex number depending on the stepped nature. Finally, the coded data blocks 125 output by the coding device 202 are fed to an inverse transformation device 203.

In a conventional manner, the inverse transformation device 203 uses an inverse fast Fourier transformation (IFFT) to transform the data that are present in the frequency domain into the time domain, N samples of a transmitter signal being directly generated from N/2 complex numbers, all N samples hereinafter being designated as a discrete multitone symbol (DMT symbol; DMT=Discrete Multitone). In this case, the complex numbers may be provided as amplitude values of cosine and sine oscillations (real part and imaginary part) to be transmitted within a data block, the frequencies being distributed equidistantly in accordance with the following relationship:

$$f_i = i \cdot \frac{1}{T} \quad i = 1, 2, \ldots N/2$$

In this case, T denotes a time duration for a transmission of a discrete multitone symbol and N denotes a number of samples for a discrete multitone symbol. By way of example, in a "downstream" mode, i.e. during a data transmission from at least one switching center to at least one subscriber, conventional ADSL-DMT methods employ 256 tones which can each be modulated in magnitude and phase as sine tones. In this case, the fundamental frequency is 4.3 kHz and the frequency spacing between successive tones is likewise 4.3 kHz. A frequency spectrum from 4.3 kHz (fundamental frequency) to (4.3 kHz+256×4.3 kHz)=1.1 MHz is thus transmitted. Each DMT symbol is thus represented by a sine tone which can be modulated in magnitude and phase, it usually being the case that, per symbol, a maximum of 15 bits are represented as a complex number. During a transmission of a multitone signal formed in this way, however, the problem arises that transient processes are brought about by the transmission channel, which may be designed as a twisted copper two-wire line, for example, said transient processes having decayed after M samples, for example.

In the transmitter device, after an inverse fast Fourier transformation (IFFT), the last M samples of a DMT symbol are attached to a block start, the following relationship holding true: M<N. This cyclic extension (cyclic prefix) makes it possible to simulate a periodic signal for the data stream receiver when the transient process caused by the transmission channel has decayed after M samples, it being possible to avoid a mutual interference between different DMT symbols, i.e. an intersymbol interference (ISI).

As a result, in conventional methods, it is possible to considerably reduce an equalization complexity in an equalization device arranged in the data stream receiver, since, after a demodulation of the receiving analog data stream 101 in the data stream receiver, it is only necessary to perform a simple correction with the inverse frequency response of the transmission channel in the correction device 112.

An essential disadvantage of a data transmission according to the ADSL method via copper lines, in the case of which multitone signals are transmitted, consists in the fact that long transient processes occur. In a conventional manner, the cyclic prefix is therefore extended in order to supply a periodic signal for the data stream receiver. However, the cyclic prefix must be kept small in relation to the DMT symbol length N, i.e. the following relationship must hold true:

$$M \ll N,$$

since otherwise a reduction of the transmission capacity occurs in a disadvantageous manner.

In the case of the ADSL standard, a DMT symbol length of N=64 and a value of a cyclic prefix of M=4 are provided, by way of example, for a data transmission from a subscriber to a switching system. In order to limit a transient process to the cyclic prefix, in the case of the known method, in the preprocessing device arranged in the data stream receiver, a special equalization device for the time domain (TDEQ=Time Domain Equalizer) is provided in the form of an adaptive transversal filter which operates with a sampling rate Fs (for example 276 kHz in the switching center in the case of ADSL).

By virtue of the required restriction of the length of the cyclic prefix to M=4, for example, as mentioned above, in the case of conventional methods for transmitting an analog data stream 101, a transmission quality is disadvantageously impaired since there is a considerable intersymbol interference (ISI) even with the use of an equalization device in the data stream receiver.

In a disadvantageous manner, a customary transmission channel furthermore contains high- and low-pass filters in order to limit the bandwidth of the analog data stream to be transmitted, and in order to suppress an out-of-band noise in analog-to-digital and digital-to-analog converters, which may be designed as sigma-delta converters, for example.

What is disadvantageous, in particular, is that, in the event of an excitation of low-pass filters with DMT signals, transient processes occur which, in a frequency range, have considerable spectral components above the envisaged transmission signal band. At a sampling rate Fs of 276 kHz, for example, spectral components which cannot be eliminated by the equalization device arranged in the data stream receiver are produced as a result of convolution products in the transmission signal band. In a disadvantageous manner, said convolution products are contained as interference signals in the transmission signal band, thereby impairing a transmission quality.

A multitone signal generated in the time domain is subsequently transmitted in the form of DMT symbols in accordance with FIG. 4. In order to provide an analog transmitter signal 211, an analog-to-digital converter is provided for a conversion from a digital multitone signal 303 into the analog transmitter signal 211.

Figure 5:
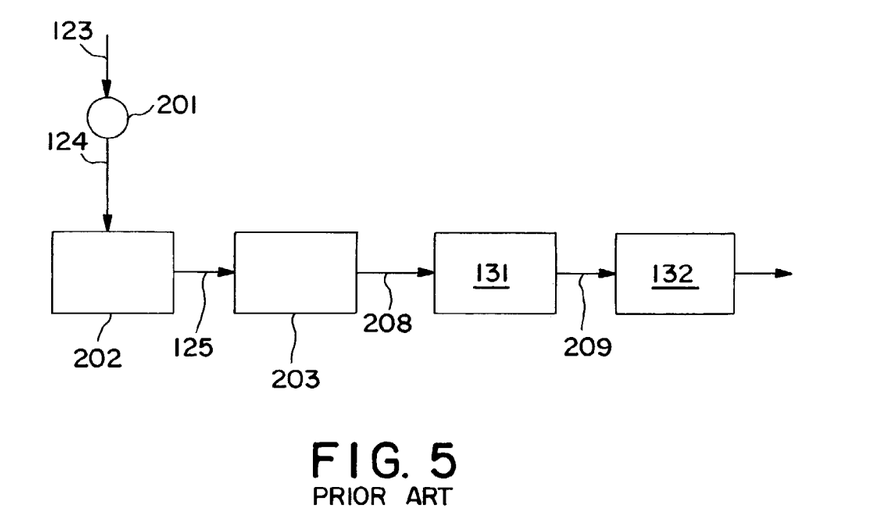
FIG. 5 shows a block diagram of a conventional data stream transmitter with a first filtering device and a second filtering device.

A further known data stream transmitter is illustrated in FIG. 5, in which case, in addition to the components illustrated in FIG. 4, a first filtering device 131' and a second filtering device 132' are arranged between the inverse transformation device 203 and the digital-to-analog converter 204.

FIG. 5 illustrates that a typical transmission channel contains high- and low-pass filters for a band limiting of channel transmission signals. As shown in FIG. 5, the discrete multitone symbol (DMT symbol) 208 is subjected to high-pass filtering in the first filtering device 131' in order to obtain a filtered discrete multitone symbol 209'. This filtered discrete multitone symbol 209' is subjected to low-pass filtering in the second filtering device 132'. The filtering devices 131' and 132' used for band limiting have the disadvantage that, in the event of an excitation with DMT symbols transient processes occur which limit a data transmission rate. Particularly when low-pass filters are used as filtering devices 131' and 132', respectively, significant spectral components which have an effect particularly in the case of a short cyclic prefix occur in the frequency range of the signal band. The time signal output by the second filtering device 132' is finally transmitted after a digital-to-analog conversion in a digital-to-analog converter, transient processes inexpediently occurring.

A main disadvantage of the conventional method illustrated in the form of a block diagram in FIGS. 4 and 5 is that a high crest factor, i.e. a high ratio of peak value to root-mean-square value of the multitone symbol to be transmitted is present in the case of the form of modulation which is used and which entails generation of a multitone signal. Conventional measures proposed in the literature for reducing the crest factor relate only to a data transmitter, whereas the influence of an analog front-end (AFE) is not taken into account. In a disadvantageous manner, the measures for reducing the crest factor in the data transmitter are generally compensated for again by the analog front-end AFE, so that a crest factor reduction is eliminated, or, in an extreme case, the crest factor can even increase as a result of these measures, due to transient processes of various digital and analog filters.

In a disadvantageous manner, high peak values governed by a high crest factor require the provision of a transmission bandwidth which does not contribute to an improvement of a signal-to-noise ratio of the multitone signal.

SUMMARY OF THE INVENTION

Consequently, it is an object of the present invention to provide a method and an apparatus for carrying out the method which provide a crest factor reduction in the multitone signals to be transmitted.

This object is achieved according to the invention by means of the method specified in patent claim 1 and by means of an apparatus having the features of patent claim 12.

Further refinements of the invention emerge from the subclaims.

An essential concept of the invention consists in predeterminable transient processes being inserted in a targeted manner in order to compensate for or at least reduce peak values of an analog transmitter signal generated in a data stream transmitter. The crest factor of the signal (ratio of peak value to root-mean-square value) is thereby reduced.

The crest factor (i.e. the ratio of peak value to the root-mean-square value of the multitone signal) can thus be reduced in an advantageous manner, thereby providing a more effective utilization of a transmission dynamic range.

A further advantage of the present invention is that existing components of the data stream transmitter, such as filtering devices, for example, can be used in order to provide transient processes by means of redundant compensation signals. The invention's method for reducing the crest factor by means of components in the data stream transmitter furthermore advantageously permits stores of filtering devices in the data stream transmitter to be preloaded with predeterminable storage values or for stores of filtering devices in the data stream transmitter to be reset.

The invention's method for transmitting an analog data stream from a data stream transmitter to a data stream receiver by means of discrete multitone symbols essentially has the following steps:

a) inputting of data to be transmitted into a data input device of the data stream transmitter;

b) coding of the data to be transmitted in a coding device and combination of the coded data to be transmitted into coded data blocks;

c) transformation of the coded data blocks into a multitone signal in an inverse transformation device;

d) conversion of the multitone signal into an analog transmitter signal in a digital-to-analog converter; and e) transmission of the analog transmitter signal via a transmission channel in order to feed an analog data stream to a preprocessing device of the data stream receiver, transient processes being provided by means of redundant compensation signals in the data stream transmitter, so that the crest factor of modulated signals of the analog data stream is reduced.

Advantageous developments and improvements of the respective subject matter of the invention can be found in the subclaims.

In accordance with one preferred development of the present invention, transient processes are predetermined in the data stream transmitter by stores of at least one filtering device provided in the data stream transmitter being preloaded with predeterminable storage values.

In accordance with a further preferred development of the present invention, storage contents of the at least one filtering device provided in the data stream transmitter decay in accordance with the recursive components of the filtering device.

In accordance with yet another preferred development of the present invention, a preloading of stores of the at least one filtering device provided in the data stream transmitter with predeterminable storage values is carried out in each case after a transmission of a discrete multitone symbol.

In accordance with yet another preferred development of the present invention, a preloading of stores of the at least one filtering device provided in the data stream transmitter with predeterminable storage values is carried out in a manner dependent on a frame synchronization signal of the analog transmitter signal.

In accordance with yet another preferred development of the present invention, the predeterminable storage values with which the at least one filtering device is preloaded are determined by an optimization by means of a linear programming.

In accordance with yet another preferred development of the present invention, the predeterminable storage values with which the at least one filtering device is preloaded are determined by means of an adaptation by a least mean squares method.

In accordance with yet another preferred development of the present invention, the at least one filtering device is provided as a high-pass filter, a low-pass filter and/or an all-pass filter.

In accordance with yet another preferred development of the present invention, an arbitrary combination of the filtering devices is provided for filtering the multitone signal fed to the digital-to-analog converter.

In accordance with yet another preferred development of the present invention, the predeterminable storage values which are fed to the at least one filtering device are determined in a storage value determining device in a manner dependent on the frame synchronization signal and on filter start values.

In accordance with yet another preferred development of the present invention, the stores of the first and/or second filtering devices designed as a high-pass filter and/or as a low-pass filter are reset, while the stores of the third filtering device designed as an all-pass filter are preloaded with predeterminable storage values. It is furthermore possible, in accordance with this preferred development of the present invention, for an arbitrary number of filtering devices to be acted on by a resetting of their stores, while the remaining filtering devices are preloaded with predeterminable storage values in order to reduce targeted transient processes for the compensation of peak values i.e. for the reduction of a crest factor of the analog transmitter signal.

The invention's apparatus for generating the analog transmitter signal in order to transmit an analog data stream from a data stream transmitter to a data stream receiver by means of discrete multitone symbols furthermore has:

a) a data input device provided in the data stream transmitter and serving for inputting data to be transmitted;
b) a coding device for coding the data to be transmitted into coded data blocks;
c) an inverse transformation device for transforming the coded data blocks into a multitone signal; and
d) a digital-to-analog converter for converting the multitone signal into the analog transmitter signal, in which case the data stream transmitter has at least one filtering device, which provides transient processes by means of redundant compensation signals in order to reduce the crest factor of modulated signals of the analog data stream.

Exemplary embodiments of the invention are illustrated in the drawings and are explained in more detail in the description below.

DETAILED DESCRIPTION OF THE INVENTION

In the figures, identical reference symbols designate identical or functionally identical components or steps.

Figure 2A:
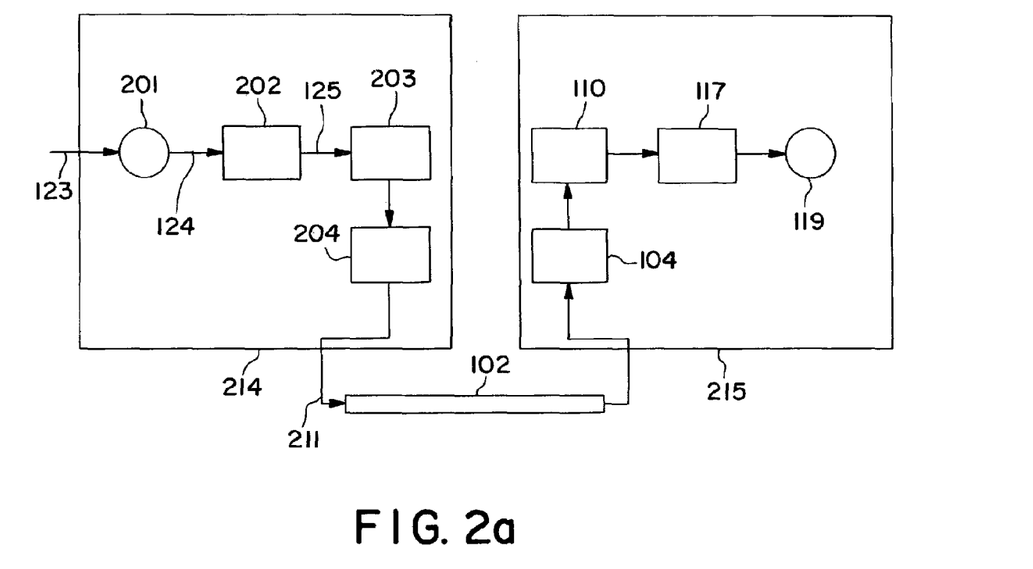
FIG. 2a shows a block diagram of a transmission link for multitone symbols with data stream transmitter, transmission channel and data stream receiver.

FIG. 2a shows a basic block diagram of an arrangement for transmitting an analog data stream according to the DMT (discrete multitone) method, a data stream transmitter 214, the transmission channel 102 and the data stream receiver 215 being illustrated.

Data stream transmitter 214 and data stream receiver 215 comprise separately identifiable blocks which are described briefly below. A data input device 201 serves for inputting data to be transmitted, the data that have been input being forwarded to a coding device 202. In the coding device 202, the data stream is decoded in accordance with a conventional method and fed to an inverse transformation 203. The inverse transformation device 203 provides a transformation from the data that are present in the frequency domain into data which are present in the time domain. The inverse transformation device 203 may be provided for example by a device in which an inverse (fast) Fourier transformation (IFFT=Inverse Fast Fourier Transformation) is carried out.

It should be pointed out that the transformation from the frequency domain into the time domain which is carried out in the inverse transformation device 203 represents a transformation which is the inverse of that transformation which is carried out by a transformation device 110 in a data stream receiver, as will be described below with reference to FIG. 3.

Finally, with reference to FIG. 2, the digital data stream output by the inverse transformation device 203 is converted into an analog data stream, i.e. an analog transmitter signal 211, by means of a digital-to-analog converter 204. The analog data stream which is now present in the time domain is fed to a transmission channel 102, which provides the data transmission described above, in which case a bandpass, high-pass and/or low-pass filtering and also an exposure of the analog data stream 101 to noise may be present during a transmission. The analog data stream 101 is fed further to the analog-to-digital converter 104, which is arranged in the data stream receiver 215 and which converts the received analog data stream 101 into a digital data stream 103, the converted digital data stream 103 being fed to the transformation device 110.

After a transformation from the frequency domain into the time domain which is the inverse of that in the transformation device 203, the transformed data stream passes through a correction device (not shown) and a determining device (not shown) and is then decoded in the decoding device 117. The decoded data stream is finally output via the data output device 119.

Figure 2B:
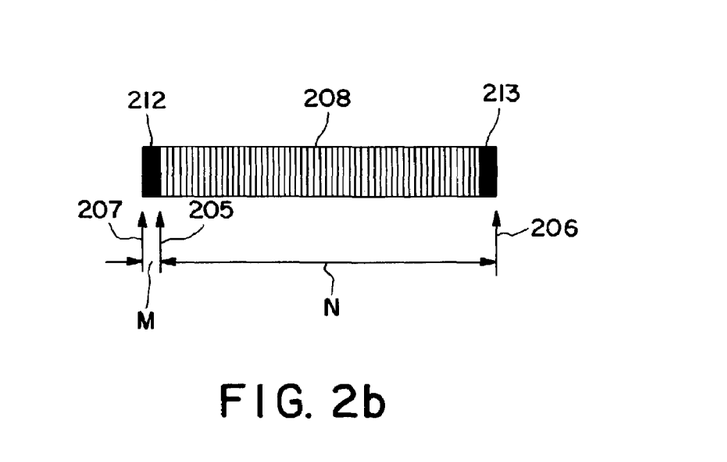
FIG. 2b diagrammatically shows a construction of a multitone symbol with a cyclic prefix.

FIG. 2b shows a diagram of a discrete multitone symbol, the analog data stream to be transmitted being provided as a sequence of multitone symbols. Before the data transformed in the inverse transformation device 203 are forwarded to the digital-to-analog converter 204, the last M samples of a multitone symbol are again attached to the block start, as a result of which a cyclic prefix is defined and where the following holds true:

M<N

In this way, a periodic signal can be simulated for a data stream receiver when the transient process caused by the transmission channel has decayed after M samples i.e. no intersymbol interference (ISI) occurs.

As shown in FIG. 2b, the original multitone symbol has a length of N samples, for example N=64, while the last four values, for example, are attached as a cyclic prefix 212 to the DMT symbol start 205, where the following holds true:

M=4.

The total length of a multitone symbol 208, with the DMT symbol end values 213 attached to the symbol start 205, now amounts to M+N from the prefix start 207 to the DMT symbol end 206.

It should be pointed out that the number of DMT symbol end values 213 that are cyclically attached to the symbol start 215 must be kept as low as possible, i.e. M<<N, in order to obtain the least possible reduction of the transmission capacity and quality.

In a further example, a multitone symbol 208 comprises 256 complex numbers, which means that 512 time samples (real and imaginary parts) have to be transmitted as a periodic signal. In this example, if a number of 32 DMT symbol end values 213 are copied as cyclic prefix 212 to the symbol start, a total length of the time sample to be transmitted is calculated as 544, which results in a sampling duration $T_A$ of $544\times10^{-6}/2.208$ seconds or 0.25 ms given a maximum tone frequency of a DMT signal of 2.208 MHz, the symbol transmission frequency being calculated from $f_{DMT}=1/T_A\approx4$ kHz.

Figure 3:
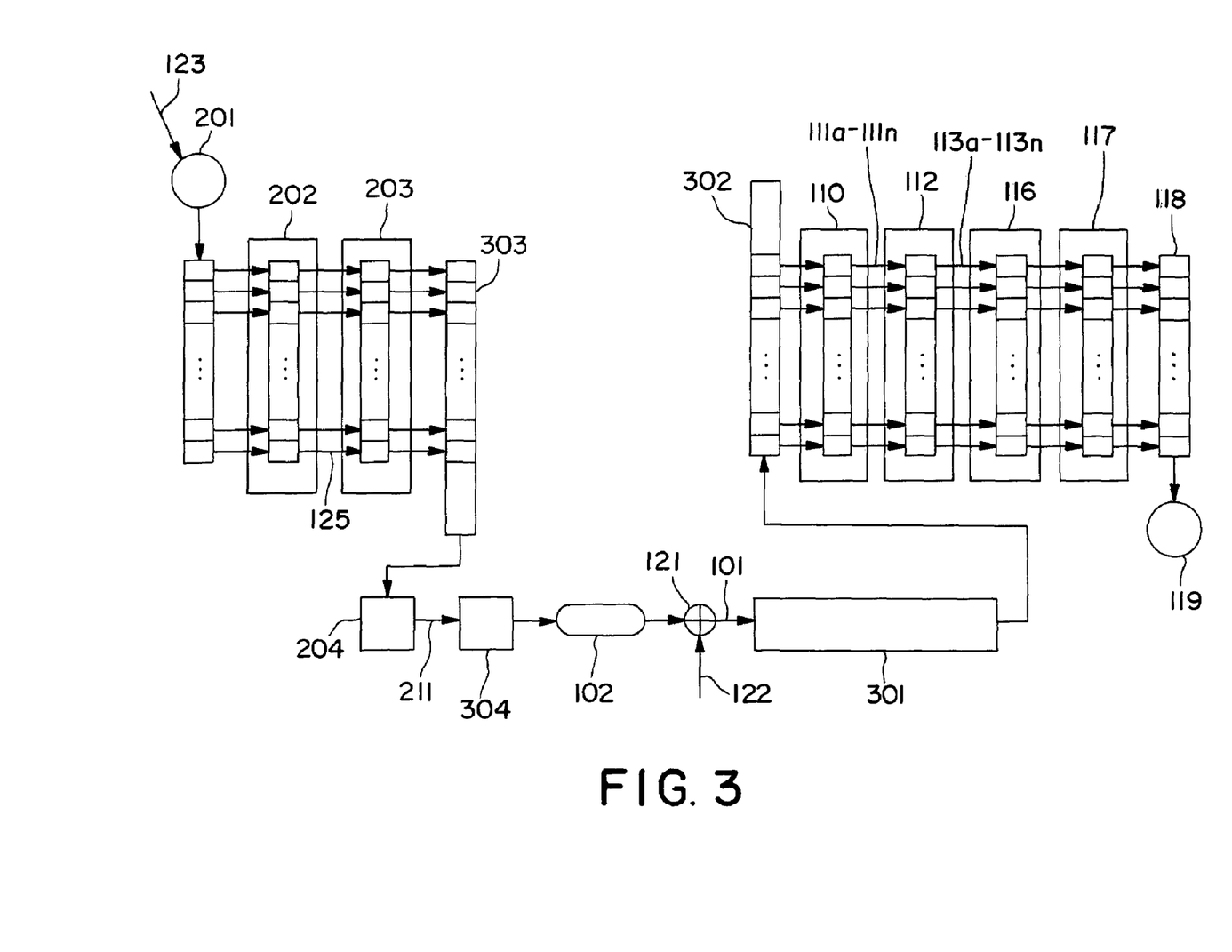
FIG. 3 shows the transmission link—illustrated in FIG. 2a—for the transmission of an analog data stream in a more detailed illustration.

FIG. 3 shows a method for transmitting an analog data stream and a circuit arrangement in a more detailed illustration.

The data stream fed to the data input device 201 is combined into blocks, a specific number of bits to be transmitted being assigned to a complex number depending on the stepped nature. Finally, a coding is effected in the coding device 202 in accordance with the stepped nature chosen, the coded data stream finally being fed to the inverse transformation device 203.

A multitone signal 303 provided by the inverse transformation device 203 finally forms a digital transmitter data stream which has been transformed from the frequency domain into the time domain. The multitone signal 203 formed as a digital data stream is finally converted into an analog data stream in the digital-to-analog converter 204 and fed to a line driver device 304.

The line driver device 304 amplifies or drives the analog data stream 101 to be transmitted into a transmission channel 102, whose channel transfer function is known or measurable, in principle. A superposition of the analog data stream with noise furthermore takes place in the transmission channel, which is represented by a superposition device 121 in FIG. 3. The analog data stream transmitted from the transmission channel and a noise signal 122 are fed to the superposition device 121, so that an analog data stream 101 superposed with noise is finally obtained.

At the receiving end, the analog data stream 101 is fed to a preprocessing device 301. A preprocessed digital data stream 302 output by the preprocessing device 301 is finally fed to the circuit units of the data stream receiver, which are explained briefly below.

The transformation device 110 provides a transformation of the decimated equalized digital data stream 109 into transformation signals 111a-111n, where n represents the maximum number, in this example 256, of the cosine or sine signals that are defined in terms of magnitude and phase. It should be pointed out that the transformation device 110 performs a digital transformation from a signal which is present in digital form in the time domain into a signal which is present in digital form in the frequency domain.

The transformation signals 111a-111n correspond for example to complex numbers for each of the multitones, an evaluation in terms of magnitude and phase or in terms of real part and imaginary part being provided. Furthermore, the complex numbers may be provided as amplitudes of cosine oscillations (real part) and sine oscillations (imaginary part) that are to be transmitted within a block, the frequencies being provided such that they are distributed equidistantly in accordance with the equation specified above, the data to be transmitted being combined in blocks.

It should be pointed out that more or fewer than 256 different tones can be transmitted as cosine or sine signals which are defined and can be modulated in terms of magnitude and phase, a correspondingly different number of transformation signals 111a-111n being produced. In this case, the first transformation signal is designated as 111a and the last transformation signal is designated as 111n. The transformation device 110 preferably carries out a fast Fourier transformation (FFT) in order to provide a fast transformation from the time domain into the frequency domain.

In a correction device 112, the transformation signals 111a-111n are weighted with a known correction function which is predetermined for the correction device 112. Preferably, but not exclusively, said correction function which is predetermined for the correction device 112 is an inverse of the channel transfer function of the transmission channel. In this case, it is possible to compensate for influences of the transmission channel with regard to frequency response, phase, etc, so that corrected transformation signals 113a-113n are obtained at the output of the correction device 112. The corrected transformation signals 113a-113n are subsequently fed to a determining device 116, in which at least one magnitude signal 114 and at least one phase signal 115, or a real part and an imaginary part of a corrected transformation signal are determined.

The magnitude signals 114 and phase signals 115 determined in the determining device are subsequently decoded by the magnitude signals 114 and the phase signals 115 being fed to a decoding device 117.

A decoding of the data stream is provided in the decoding device 117. Consequently, the decoding device 117 outputs a decoded data stream 118, which is finally fed to a data output device 119 and can be output from there and subjected to further processing.

Figure 1A:
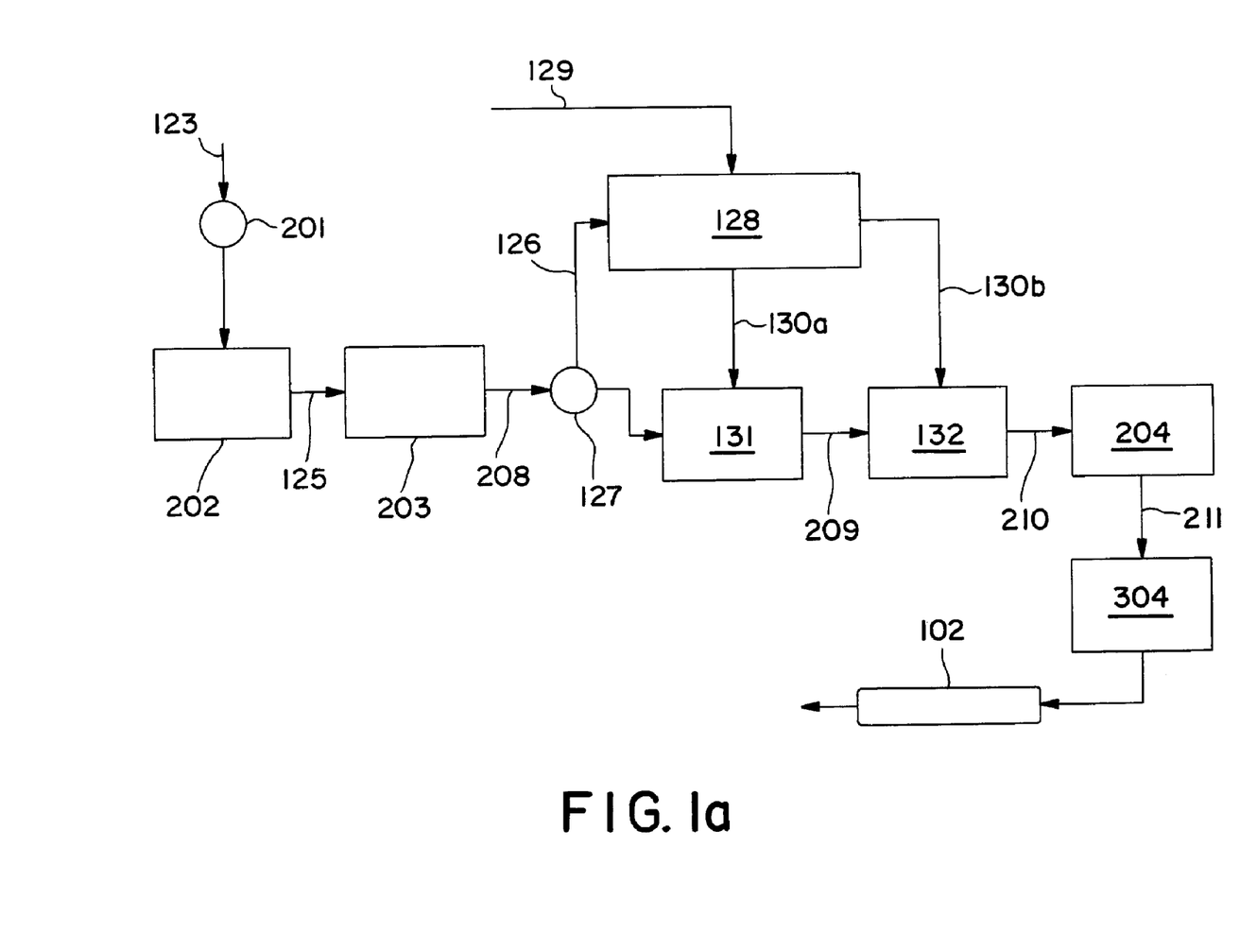
FIG. 1a shows a block diagram of a data stream transmitting device with first and second filtering devices and also a storage value determining device in accordance with one preferred exemplary embodiment of the present invention.

FIG. 1a shows a block diagram of a data stream transmitter in which a first filtering device 131 and a second filtering device 132 are preloaded with storage values 130a and 130b, respectively, in such a way that transient processes are already predetermined at the transmitter end. Data 123 to be transmitted are input into the data input device 201, coded in a coding device 202 and combined to form coded data blocks 125, as described above.

The coded data blocks 125 are fed to the inverse transformation device 203, which, by means of an inverse transformation from a frequency domain into a time domain, provides a digital data stream in the form of discrete multitone symbols (DMT symbols) 208.

The DMT symbol data stream 208 is fed to the first filter device 131 via an extraction device 127. Filter start values 126 are extracted in the extraction device 127, the number of extracted filter start values n depending on the order of the first filtering device 131 and/or the second filtering device 132. If a second-order filter is used, by way of example, as will be described below with reference to FIG. 6, then two filter start values 126 are extracted in the extraction device 127, in which case, as already explained above, the first two data values of a multitone symbol including the cyclic prefix, as illustrated in FIG. 2b, are forwarded. The filter start values 126 are fed to the storage value determining device 128, the storage value determining device furthermore receiving a frame synchronization signal 129 for synchronization with regard to a transmission of the data stream to be transmitted in the form of multitone symbols.

During a sequential transmission of the discrete multitone symbols 208, transient processes inherent to the transmission system described can thus be used in a targeted manner for reducing the crest factor by the at least one first and/or second filtering device 131 and/or 132 being precharged with the corresponding storage values 130a and/or 130b, respectively. The corresponding storage contents then decay in accordance with the recursive components of the respective filtering device, as a result of which redundant compensation signals can be generated for reducing the crest factor.

The corresponding transient processes are thus predetermined in the data stream transmitter 214 after stores of at least one filtering device 131 or 132 provided in the data stream transmitter 214 have been preloaded with the predeterminable storage values 130a or 130b. The storage contents of the at least one filtering device 131 or 132 provided in the data stream transmitter 214 can furthermore decay in accordance with the recursive components of the filtering device 131 or 132. A preloading of stores of the at least one filtering device 131 or 132 provided in the data stream transmitter 214 with predeterminable storage values 130a or 130b is carried out for example in each case after a transmission of a discrete multitone symbol 208.

Figure 1B:
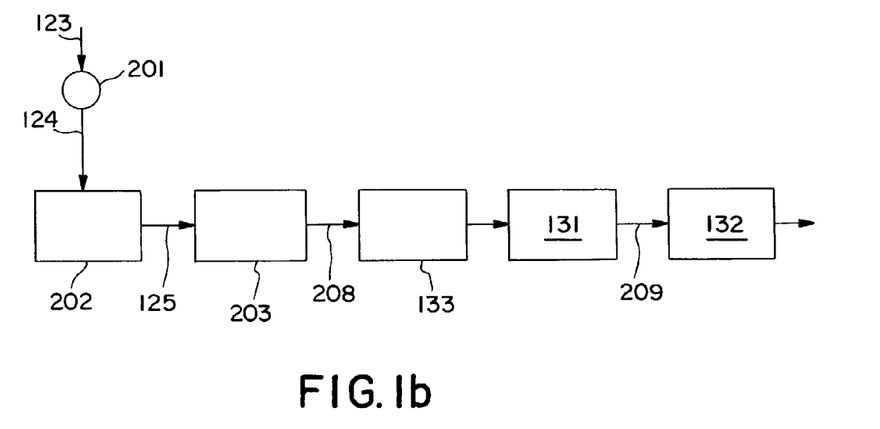
FIG. 1b shows a data stream transmitter device augmented by a third filtering device in accordance with a further preferred exemplary embodiment of the present invention.

In the block diagram shown in FIG. 1b in accordance with a further preferred exemplary embodiment of the present invention, reference symbols identical to those in FIG. 1a designate identical or functionally identical components, so that, in order to avoid an overlapping description, these are not explained here. In FIG. 1b, an all-pass filter is inserted between the inverse transformation device 203 and the first filtering device 131 as a third filtering device 133.

Inserting the third filtering device 133 as an all-pass filter has the advantage according to the invention of providing a greater flexibility with regard to a selection of a length of transient processes. It is thus possible, with the method shown in FIG. 1b, to influence transient processes at the data stream transmitter end by means of first, second and third filtering devices 131, 132 and 133. The provision of storage values 130a-130c for the respective filtering devices 131, 132 and 133 will be described below with reference to FIG. 1c.

Figure 1C:
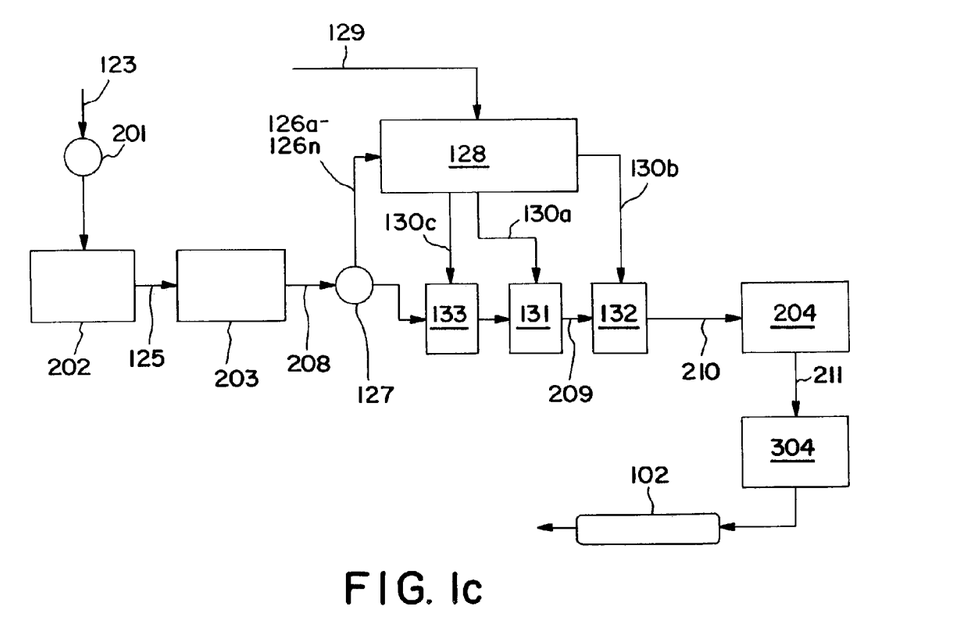
FIG. 1c shows a block diagram of a data stream transmitting device in accordance with FIG. 1a which has been augmented by a third filtering device.

FIG. 1c shows a complete block diagram in accordance with a preferred exemplary embodiment of the present invention, the storage value determining device 128 applying storage values 130a, 130b and 130c to the first, second and third filtering devices 131, 132 and 133, respectively, thereby affording the greatest possible variability when predetermining storage values and thus when setting transient processes in a targeted manner.

In an advantageous manner, a determination of the storage values by the storage value determining device 128 is synchronized with the frame synchronization signal 129 provided by a multitone signal transmission. Furthermore, filter start values 126 from the extraction device 127 are fed to the storage value determining device 128, as already explained with reference to FIG. 1a.

It should be pointed out that it is generally possible to provide fewer than three or more than three filtering devices 131, 132, 133. Furthermore, it is possible to apply storage values to only a predeterminable number of the filtering devices provided, while the remaining filtering devices are merely reset—i.e. their storage contents are set to zero—in a manner synchronized with the frame synchronization signal.

While the first and second filtering devices 131' and 132' are also used in conventional data stream transmitters, provision is not conventionally made for these filtering devices to be preloaded with storage values 130a and 130b, respectively, in such a way that transient processes are provided by means of redundant compensation signals, so that the crest factor of modulated signals of the transmitter signal 211 or of the transmitted analog data stream 101 is reduced. The transmission band defined in a transmission standard essentially defines cut-off frequencies of band limiting filters, and the length of transient processes is thus also defined.

This fact does not play a part for example for the upstream channel in the case of ADSL, because in this case the transient processes of the band limiting filters are intrinsically "long" enough to completely cover a DMT symbol. By contrast, in the case of the downstream channel in the case of ADSL, transient processes are too "short", i.e. a cut-off frequency is very high. As already mentioned, an additional flexibility is achieved by means of a predeterminable selection of lengths of transient processes by inserting, according to the invention, at least one more or less freely selectable all-pass filter as a third filtering device 133 into the transmission path of the data stream transmitter 214. A particular advantage of inserting an all-pass filter as a third filtering device 133 is that a transmission PSD mask defined in a transmission standard is complied with.

In an advantageous manner, suitable storage values 130a-130b are determined from known discrete multitone symbols 208 to be transmitted using various optimizations (for example least squares method, linear programming, etc).

All or some of the filtering devices 131, 132 and 133 have recursive components which determine a decay of storage contents of the at least one filtering device 131, 132 or 133. Preferably, a first filtering device is designed as a high-pass filter, at least one further, second filtering device 132 is designed as a low-pass filter and a third filtering device 133 that can optionally be added is designed as an all-pass filter.

With regard to the block diagrams of conventional data stream transmitters illustrated in FIGS. 4 and 5, reference is made to the introduction to the description.

Although the present invention has been described above using preferred exemplary embodiments, it is not restricted thereto, but rather can be modified in diverse ways.

Moreover, the invention is not restricted to the application possibilities mentioned.

LIST OF REFERENCE SYMBOLS

In the figures, identical reference symbols designate identical or functionally identical components or steps.
101 Analog data stream
102 Transmission channel
103 Digital data stream
104 Analog-to-digital converter
105 Equalization device
106 Equalized digital data stream
107 Decimation device
108 Sampling rate
109 Decimated equalized digital data stream
110 Transformation device
111a- Transformation signals
111n
112 Correction device
113a- Corrected transformation signals
113n
114 Magnitude signal
115 Phase signal
116 Determining device
117 Decoding device
118 Decoded data stream
119 Data output device
120 Symbol rate
121 Superposition device
122 Noise signal
123 Data to be transmitted
125 Coded data blocks
126 Filter start value
127 Extraction device
128 Storage value determining device
129 Frame synchronization signal
130a, Storage values
130b,
130c
131, First filtering device
131'
132, Second filtering device
132'
133 Third filtering device
201 Data input device
202 Coding device
203 Inverse transformation device
204 Digital-to-analog converter
205 DMT symbol start
206 DMT symbol end
207 Prefix start
208 Discrete multitone symbol (DMT symbol)
209, Filtered discrete multitone symbol (DMT symbol)
209'
210 Transient-compensated discrete multitone symbol (DMT symbol)
211 Analog transmitter signal
212 Prefix
213 DMT symbol end values
214 Data stream transmitter
215 Data stream receiver
301 Preprocessing device
302 Preprocessed digital data stream
303 Multitone signal
304 Line driver device

What is claimed is:

1. Method for transmitting an analog data stream from a data stream transmitter to a data stream receiver by means of discrete multitone symbols, in which:
a) inputting data to be transmitted into a data input device of the data stream transmitter;
b) coding the data to be transmitted in a coding device and combining the data to be transmitted into coded data blocks;
c) transforming the coded data blocks into a multitone signal in an inverse transformation device;
d) converting the multitone signal into an analog transmitter signal in a digital-to-analog converter; and
e) transmitting the analog transmitter signal via a transmission channel, wherein transient processes are provided by means of redundant compensation signals in the data stream transmitter, so that the crest factor of modulated signals of the analog data stream is reduced, and wherein transient processes are predetermined in the data stream transmitter by stores of at least one filtering device provided in the data stream transmitter being preloaded with predeterminable storage values, wherein storage contents of the at least one filtering device provided in the data stream transmitter decay in accordance with recursive components of the filtering device such that the redundant compensation signals are generated.

2. Method according to claim 1, wherein a preloading of stores of the at least one filtering device provided in the data stream transmitter with predeterminable storage values is carried out in each case after a transmission of a discrete multitone symbol.

3. Method according to claim 2, wherein a preloading of stores of the at least one filtering device provided in the data stream transmitter with predeterminable storage values is carried out in a manner dependent on a frame synchronization signal of the analog transmitter signal.

4. Method according to claims 1, wherein the predeterminable storage values are determined by an optimization by means of a linear programming.

5. Method according to claims 1, wherein the predeterminable storage values are determined by an optimization by means of an adaptation using least mean squares.

6. Method according to claim 1, wherein the predeterminable storage values which are fed to the at least one filtering device are determined in a storage value determining device in a manner dependent on the frame synchronization signal and on filter start values.

7. Method according to claims 1, wherein the stores of the first and/or second filtering devices designed as a high-pass filter and/or as a low-pass filter are reset, while the stores of the third filtering device designed as an all-pass filter are preloaded with predeterminable storage values.

8. An apparatus for generating an analog transmitter signal in order to transmit an analog data stream from a data stream transmitter to a data stream receiver by means of discrete multitone symbols, having:
  a) a data input device provided in the data stream transmitter and serving for inputting data to be transmitted;
  b) a coding device for coding the data to be transmitted into coded data blocks;
  c) an inverse transformation device for transforming the coded data blocks into a multitone signal; and
  d) a digital-to-analog converter for converting the multitone signal into the analog transmitter signal, wherein the data stream transmitter has at least one filtering device, which provides transient processes by means of redundant compensation signals in order to reduce the crest factor of modulated signals of the analog data stream, wherein the at least one filtering device has recursive components which determine a decaying of storage contents of the at least one filtering device, wherein the storage contents of the at least one filtering device provided in the data stream transmitter decay such that the redundant compensation signals are generated.

9. Apparatus according to claim 8, wherein the at least one filtering device is designed as an all-pass filter.

10. Apparatus according to claim 8, wherein a storage value determining device is provided, which generates predeterminable storage values which are fed to the at least one filtering device.

* * * * *